(12) United States Patent
Maita et al.

(10) Patent No.: US 10,394,920 B2
(45) Date of Patent: Aug. 27, 2019

(54) DATA VERIFICATION DEVICE

(71) Applicant: FUJITSU LIMITED, Kawasaki-shi, Kanagawa (JP)

(72) Inventors: Tsuyoshi Maita, Aomori (JP); Nobumi Noro, Aomori (JP); Tetsu Tanaka, Hirosaki (JP)

(73) Assignee: FUJITSU LIMITED, Kawasaki (JP)

( * ) Notice: Subject to any disclaimer, the term of this patent is extended or adjusted under 35 U.S.C. 154(b) by 210 days.

(21) Appl. No.: 15/590,569

(22) Filed: May 9, 2017

(65) Prior Publication Data

US 2017/0242865 A1 Aug. 24, 2017

Related U.S. Application Data

(63) Continuation of application No. PCT/JP2014/080275, filed on Nov. 14, 2014.

(51) Int. Cl.
*G06F 16/9537* (2019.01)
*G06K 9/62* (2006.01)
(Continued)

(52) U.S. Cl.
CPC ........ *G06F 16/9537* (2019.01); *G06F 16/951* (2019.01); *G06K 9/623* (2013.01);
(Continued)

(58) Field of Classification Search
CPC ...... G06F 16/9537; G06F 16/958; G06F 7/08; G06F 19/00; G06F 16/9566; G06F 16/29; G06F 16/951; G06F 17/30864; G06F 16/335; G06F 17/30699; G06F 9/465; G06F 9/4488; G06Q 30/0269; G06Q 30/0246; G06Q 30/0275; G06Q 30/0609;
(Continued)

(56) References Cited

U.S. PATENT DOCUMENTS

| | | | |
|---|---|---|---|
| 5,867,494 A * | 2/1999 | Krishnaswamy | ... H04L 12/1485 370/352 |
| 6,363,411 B1 * | 3/2002 | Dugan | ......... H04M 3/42136 379/201.01 |

(Continued)

FOREIGN PATENT DOCUMENTS

| | | |
|---|---|---|
| EP | 1363207 A2 | 11/2003 |
| EP | 1363207 A3 | 11/2003 |

(Continued)

OTHER PUBLICATIONS

Extended European Search Report dated Jul. 7, 2017 in corresponding European Patent Application No. 14905953.7.
(Continued)

*Primary Examiner* — Aklilu K Woldemariam
(74) *Attorney, Agent, or Firm* — Staas & Halsey LLP (57) ABSTRACT

A data verification device includes a processor configured to: specify, out of a plurality of sites registered as acquisition sources of specific information, reliability of the site from which the information was acquired as the specific information based on storage content of a storage that stores therein the reliability in association with each of the sites; and output the information acquired as the specific information together with the specified reliability.

3 Claims, 10 Drawing Sheets

(51) Int. Cl.
*H04L 29/06* (2006.01)
*H04L 29/08* (2006.01)
*G06F 16/951* (2019.01)
*G06F 7/08* (2006.01)
*G06Q 30/06* (2012.01)
*G06T 7/00* (2017.01)
*H04L 9/32* (2006.01)

(52) U.S. Cl.
CPC ........ *H04L 63/0853* (2013.01); *H04L 67/146* (2013.01); *G06F 7/08* (2013.01); *G06Q 30/0609* (2013.01); *G06T 7/001* (2013.01); *H04L 9/32* (2013.01)

(58) Field of Classification Search
CPC ... G06Q 30/08; H04L 12/1453; H04L 47/822; H04L 67/00; H04L 67/34; H04L 29/06027; H04L 63/0853; H04L 67/146; H04L 9/32; H04M 7/1285; H04Q 3/0062; G16H 40/63; G06T 7/001; H04N 21/816; H04N 21/4532; G01C 21/32; Y10S 707/99931; Y10S 707/99932; Y10S 707/99933; Y10S 707/99934; G06K 9/623; G06K 9/62
USPC ................. 707/706, 705, 707, 1, 2, 3, 4, 10; 709/202, 203, 219, 220, 227
See application file for complete search history.

(56) References Cited

U.S. PATENT DOCUMENTS

| | | | | |
|---|---|---|---|---|
| 6,606,660 | B1* | 8/2003 | Bowman-Amuah | H04L 65/602 709/227 |
| 6,738,931 | B1* | 5/2004 | Osborn | G06F 11/008 714/25 |
| 6,799,202 | B1* | 9/2004 | Hankinson | G06F 9/50 709/203 |
| 6,879,978 | B2* | 4/2005 | Yoshiura | G06F 16/951 707/706 |
| 6,917,976 | B1* | 7/2005 | Slaughter | G06F 9/465 709/226 |
| 2003/0074250 | A1* | 4/2003 | Burk | G06Q 10/087 705/28 |
| 2007/0050328 | A1* | 3/2007 | Li | G06F 16/9032 |
| 2007/0078838 | A1* | 4/2007 | Chung | G06F 16/951 |
| 2007/0208699 | A1 | 9/2007 | Uetabira et al. | |
| 2011/0167059 | A1* | 7/2011 | Fallah | G06Q 30/08 707/723 |
| 2011/0258049 | A1* | 10/2011 | Ramer | G06Q 30/02 705/14.66 |
| 2011/0276263 | A1* | 11/2011 | Shimotani | G01C 21/32 701/532 |
| 2012/0101975 | A1* | 4/2012 | Khosravy | G06Q 30/02 706/55 |
| 2012/0239736 | A1* | 9/2012 | Shimotani | G01C 21/32 709/203 |
| 2014/0101124 | A1 | 4/2014 | Scriffignano et al. | |
| 2014/0325307 | A1* | 10/2014 | Resch | G06F 11/1076 714/763 |
| 2016/0092559 | A1* | 3/2016 | Lind | G06F 16/639 715/716 |
| 2018/0034853 | A1* | 2/2018 | Tan | H04L 9/32 |

FOREIGN PATENT DOCUMENTS

| | | |
|---|---|---|
| JP | 2001-318947 | 11/2001 |
| JP | 2008-165284 | 7/2008 |
| JP | 2009-110334 | 5/2009 |
| JP | 2010-231560 | 10/2010 |
| WO | WO 2006/027973 A1 | 3/2006 |

OTHER PUBLICATIONS

International Search Report dated Feb. 10, 2015 in corresponding International Application No. PCT/JP2014/080275.
Written Opinion of the International Searching Authority dated Feb. 10, 2015 in corresponding International Application No. PCT/JP2014/080275.
Communication Pursuant to Article 94(3) EPC, dated Jan. 16, 2019, in European Application No. 14905953.7 (7 pp.).

* cited by examiner

FIG.3

| URL ID | TARGET URL | STORAGE AREA |
|---|---|---|
| 1 | http://aaaa.bbb.ccc/ddd/eee/001.html | D:¥page¥aaaa.bbb.ccc¥ddd¥eee¥001 |
| 2 | http://aaaa.fff.ccc/ddd/eee/001.html | D:¥page¥aaaa.fff.ccc¥ddd¥eee¥001 |
| 3 | http://aaaa.ggg.ccc/ddd/eee/001.html | D:¥page¥aaaa.ggg.ccc¥ddd¥eee¥001 |
| ... | ... | ... |

| URL ID | ITEM | VALUE |
|---|---|---|
| 1 | NAME | SANNAI MARUYAMA SITE |
| | ADDRESS | xxx AZA MARUYAMA, SANNAI, AOMORI CITY |
| | TELEPHONE NUMBER | 017-781-xxxx |
| | ... | ... |
| 2 | NAME | SPECIAL HISTORICAL SITE SANNAI MARUYAMA SITE |
| | ADDRESS | ppp AZA MARUYAMA, SANNAI, AOMORI CITY |
| | TELEPHONE NUMBER | 017-781-pppp |
| | ... | ... |
| ... | ... | ... |
| 21 | NAME | HAKKODA ROPEWAY |
| | ADDRESS | yyy AZA KANSUIZAWA, ARAKAWA, AOMORI-SHI |
| | TELEPHONE NUMBER | 017-738-yyyy |
| | ... | ... |
| ... | ... | ... |
| 31 | NAME | TSUGARUHAN NEPTA MURA |
| | ADDRESS | zzz KAMENOKOMACHI, HIROSAKI CITY, AOMORI PREFECTURE |
| | TELEPHONE NUMBER | 0172-39-zzzz |
| | ... | ... |
| ... | ... | ... |

| NAME | ITEM | URLID | VALUE | FACTOR OF RELIABILITY | | | RELIABILITY OF VALUE |
|---|---|---|---|---|---|---|---|
| | | | | INFORMATION PROVIDER | INFORMATION FRESHNESS | INFORMATION AMOUNT | |
| SANNAI MARUYAMA SITE | ADDRESS | 1 | xxx AZA MARUYAMA, SANNAI, AOMORI CITY | 3 | 3 | 2 | 8 |
| | | 2 | ppp AZA MARUYAMA, SANNAI, AOMORI CITY | 2 | 2 | 1 | 5 |
| | | 3 | qqq AZA MARUYAMA, SANNAI, AOMORI CITY | 2 | 3 | 2 | 7 |
| | | ... | ... | ... | ... | ... | ... |
| | TELE- PHONE NUMBER | 1 | 017-781-xxxx | 3 | 2 | 2 | 7 |
| | | 2 | 017-781-pppp | 2 | 1 | 1 | 4 |
| | | 3 | 017-781-qqqq | 2 | 1 | 1 | 4 |
| | | ... | ... | ... | ... | ... | ... |
| | ... | ... | ... | ... | ... | ... | ... |
| ... | | | | | | | |

FIG.6

| NAME | ITEM | GROUP OF VALUE | NUMBER OF SITES | TOTAL OF RELIABILITY OF VALUE IN EACH SITE | ... |
|---|---|---|---|---|---|
| SANNAI MARUYAMA SITE | ADDRESS | xxx AZA MARUYAMA, SANNAI, AOMORI CITY | 10 | 73 | ... |
| | | ppp AZA MARUYAMA, SANNAI, AOMORI CITY | 3 | 18 | ... |
| | | qqq AZA MARUYAMA, SANNAI, AOMORI CITY | 2 | 10 | ... |
| | | ... | ... | ... | ... |
| | TELEPHONE NUMBER | 017-781-xxxx | 9 | 63 | ... |
| | | 017-781-pppp | 4 | 16 | ... |
| | | 017-781-qqqq | 2 | 8 | ... |
| | ... | ... | ... | ... | ... |
| ... | ... | ... | ... | ... | ... |

FIG.7

RELIABILITY OF EACH SPOT INFORMATION

| NAME | ITEM | VALUE | RELIA-BILITY |
|---|---|---|---|
| SANNAI MARUYAMA SITE | ADDRESS | xxx AZA MARUYAMA, SANNAI, AOMORI CITY | 27 |
| | TELEPHONE NUMBER | 017-781-xxxx | 27 |
| | ... | ... | ... |
| ... | ... | ... | ... |

FIG.8

RELIABILITY OF EACH SPOT INFORMATION

| NAME | ITEM | VALUE | RELIA-BILITY |
|---|---|---|---|
| SANNAI MARUYAMA SITE | ADDRESS | xxx AZA MARUYAMA, SANNAI, AOMORI CITY | 73 |
| | TELEPHONE NUMBER | 017-781-xxxx | 63 |
| | ... | ... | ... |
| ... | ... | ... | ... |

DATA VERIFICATION DEVICE

CROSS-REFERENCE TO RELATED APPLICATION

This application is a continuation application of International Application PCT/JP2014/080275, filed on Nov. 14, 2014, and designating the U.S., the entire contents of which are incorporated herein by reference.

FIELD

The present invention relates to a data verification program, a data verification method, and a data verification device.

BACKGROUND

For tools to collect information released on the Internet, a crawler tool has been known. The crawler tool circulates websites on the Internet and stores the content in units of uniform resource locator (URL), that is, in units of pages. Furthermore, on map data, it has been developed to search a name or an address on the Internet and, depending on the number of hits in the result of search, to determine whether it is an error.

In addition, it has been developed to collect rumor information on the Internet, and for each site frosts which the rumor information was acquired, obtain scores in novelty, credibility, influence, and risk, for example, to provide them to users of the rumor information.

Patent Document 1: Japanese Laid-open Patent Publication No. 2010-231560

Patent Document 2: Japanese Laid-open Patent Publication No. 2008-165234

However, in the case of a place-name that is difficult to read, for example, the number of sites that describe incorrect readings may be greater than the number of sites that describe the correct reading. For this reason, it is difficult to determine which is correct or incorrect by the number of search results in a uniform manner. In addition, because the rumor information includes a variety of kinds of information, in order to verify the correctness of a desired piece of information, unnecessary pieces of information may become enormous and efficiency may deteriorate.

SUMMARY

According to an aspect of the embodiments, a data verification device includes a processor configured to: specify, out of a plurality of sites registered as acquisition sources of specific information, reliability of the site from which the information was acquired as the specific information based on storage content of a storage that stores therein the reliability in association with each of the sites; and output the information acquired as the specific information together with the specified reliability.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

With reference to the accompanying drawings, the following describes in detail an exemplary embodiment of a data verification program, a data verification method, and a data verification device disclosed in the present application. The disclosed technology, however, is not intended to fee limited by the embodiment. The following embodiment may be combined as appropriate within a scope of being not inconsistent.

First Embodiment

Figure 1:
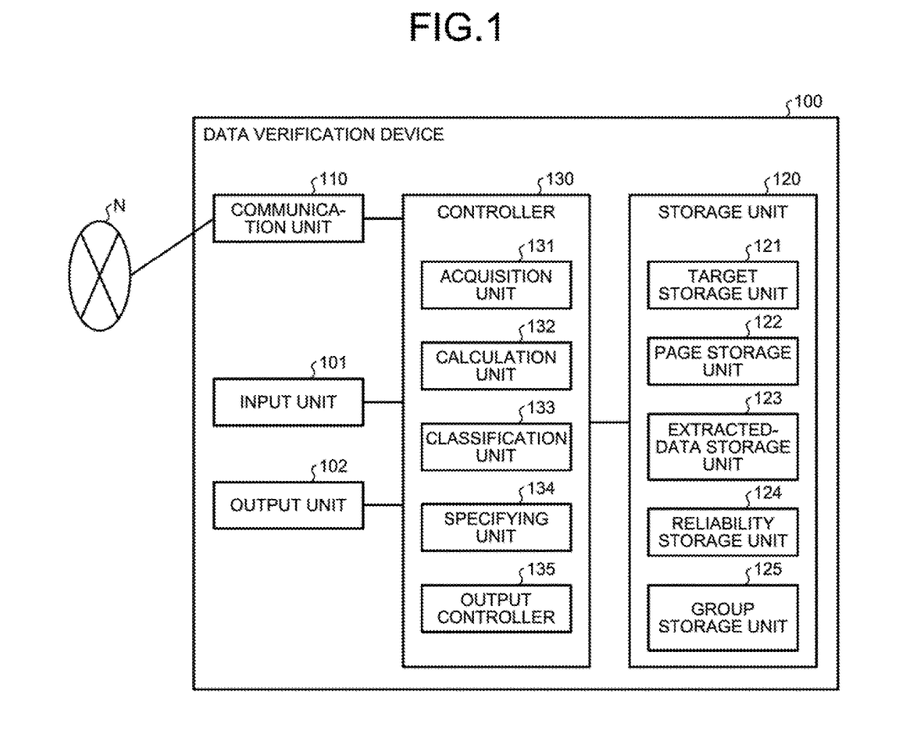
FIG. 1 is a block diagram illustrating one example of a configuration of a data verification device.

FIG. 1 is a block diagram illustrating one example of a configuration of a data verification device. A data verification device 100 illustrated in FIG. 1 is connected to the Internet via a network N, circulates websites on the Internet (hereinafter also referred to as sites) designated by an administrator, acquires certain data, and stores it in a database, for example. The data verification device 100, in order to acquire tourist information on a certain area, circulates sites of tourist spots and tourist information sites that prefectural governments provide and acquires data such as the address, telephone number, and descriptive text of each tourist spot, for example. At this time, in the sites of each tourist spot or in the tourist information sites, the data (values) of an identical item may differ. Thus, the data verification device 100 calculates the reliability of data for the identical item acquired from each site, and outputs the reliability of data for each data of the item or for each site.

That is, out of a plurality of sites registered as acquisition sources of specific information, the data verification device 100 specifies, based on storage content of a storage unit that stores the reliability in association with each of the sites, the reliability of the site from which the information was acquired as the specific information. Furthermore, the data verification device 100 outputs the information acquired as the specific information together with the specified reliability. Consequently, the data verification device 100 can output the data (information) of the item together with the reliability, and thus highly reliable information can be set as the information to be described in a document. That is, the data verification device 100 can enhance the reliability of the information to be described in the document and output it.

Examples of the document include documents described in a markup language, and include a hypertext markup language (HTML) document, an extensible markup language (XML) document, and others, for example. In the following description, as one example, a situation of circulating websites using HTML documents and verifying acquired data will be explained.

Next, the configuration of the data verification device 100 will be described. As illustrated in FIG. 1, the data verification device 100 includes an input unit 101, an output unit 102, a communication unit 110, a storage unit 120, and a controller 130. It does not matter even if the data verification device 100 is to further include various functional units that a known computer includes, in addition to the functional units illustrated in FIG. 1.

The input unit 101 is an input device such as a keyboard and a mouse, and receives input of various types of information from the administrator of the data verification device 100, for example. For example, the input unit 101 enables the administrator of the data verification device 100 to input thereto URLs of sites to circulate, data items to acquire, and others, and the input unit 101 outputs the input result to the controller 130. Furthermore, the input unit 101 may be a reader/writer such as a secure digital (SD) memory card, for example. The input unit 101 outputs the URLs of sites to circulate, the data items to acquire, and others, which have been read from the SD memory card, to the controller 130, for example. The input unit 101 may include both the input device and the reader/writer such as an SD memory card.

The output unit 102 is a display device to display various types of information, for example. The output unit 102 is implemented by a liquid crystal display or the like as a display device, for example. Furthermore, the output unit 102 may be a reader/writer such as an SD memory card, for example. The output unit 102, upon receiving output data from the controller 130, displays the output data or writes it to the memory card. The input unit 101 and the output unit 102 may be integrally combined, and may be a device that has both functions like a reader/writer such as an SD memory card, for example. The output unit 102 may include both the display device and an SD card reader/writer, for example.

The communication unit 110 is implemented toy a network interface card (NIC) or the like, for example. The communication unit 110 is a communication interface that is connected to the Internet in a wired or wireless manner via the network N and administers the communication of information with servers of various sites on the Internet, for example. The communication unit 110 receives page content such as HTML documents and image files from the various sites on the Internet, for example. The communication unit 110 outputs the received page content to the controller 130. Furthermore, the communication unit 110 transmits to various sites on the Internet a page request and others that are received from the controller 130.

The storage unit 120 is implemented by a semiconductor memory device such as a random-access memory (RAM) and a flash memory or by a storage device such as a hard disk and an optical disc, for example. The storage unit 120 includes a target storage unit 121, a page storage unit 122, an extracted-data storage unit 123, a reliability storage unit 124, and a group storage unit 125. The storage unit 120 stores therein information used for processing in the controller 130.

Figure 2:
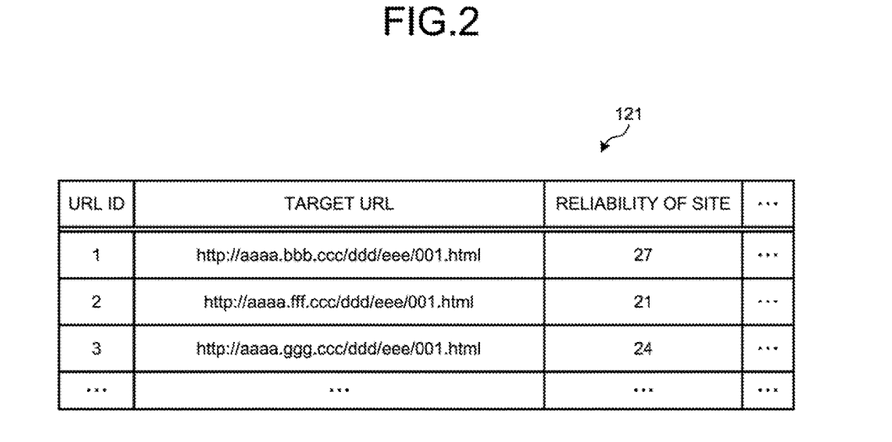
FIG. 2 is a diagram illustrating one example of a target storage unit.

The target storage unit 121 stores therein the URL (hereinafter referred to as target URL) of the site to be a target of a crawling process to acquire data, and the reliability of the site, in association with a URL ID. FIG. 2 is a diagram illustrating one example of the target storage unit. As illustrated in FIG. 2, the target storage unit 121 includes items such as "URL ID", "target URL", and "reliability of site". The target storage unit 121 stores them as one record for each target URL, for example.

"URL ID" identifies the target URL. "Target URL" indicates the URL of an HTML document to be the target of access in the crawling process. The target URL is input from the input device of the input unit 101 by the administrator, for example. "Reliability of site" indicates the reliability of the site of a target URL based on the information in the HTML document of the target URL. The reliability of site can be a total value of the reliability of each, item in the HTML document, for example.

Figure 3:
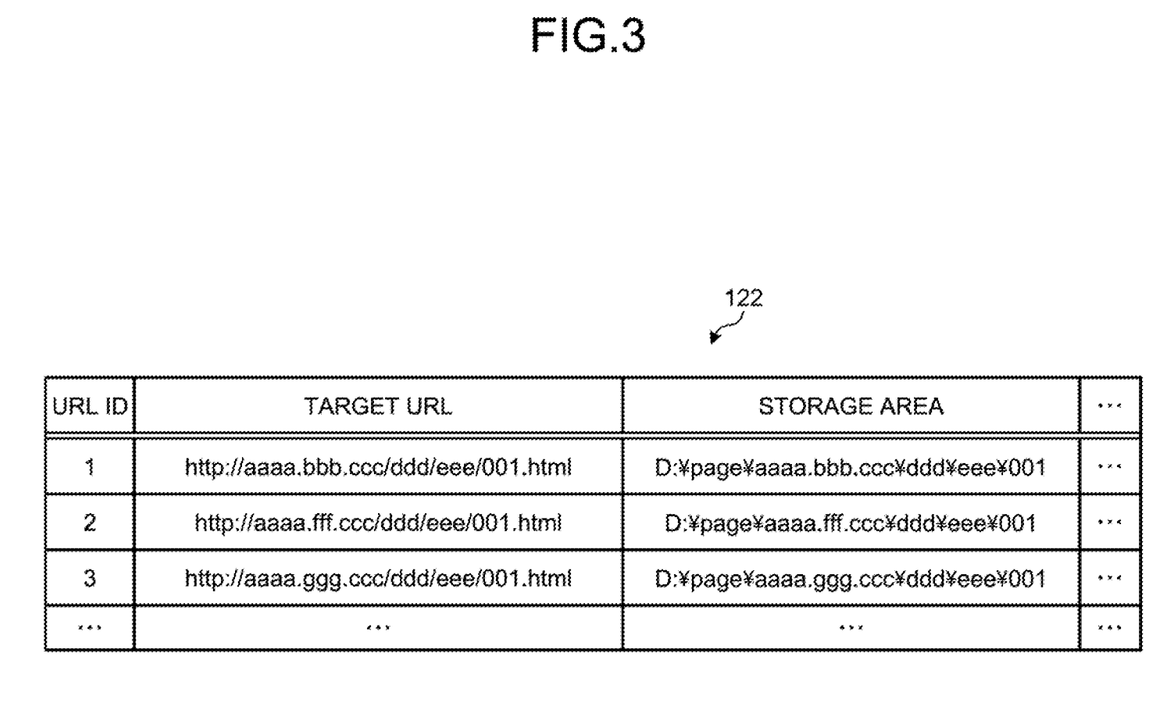
FIG. 3 is a diagram illustrating one example of a page storage unit.

Returning to the description of FIG. 1, the page storage unit 122, on the target URL, stores therein the page content acquired by accessing in the crawling process, that is, HTML documents and image files, for example. FIG. 3 is a diagram illustrating one example of the page storage unit. As illustrated in FIG. 3, the page storage unit 122 includes items such as "URL ID", "target URL", and "storage area". The page storage unit 122 stores them as one record for each target URL, for example.

"URL ID" identifies the target URL. "Target URL" indicates the URL of an HTML document that has been accessed in the crawling process. "Storage area" indicates the storage area in which the acquired HTML documents, image files, and others are stored. The storage area stores therein a directory of a file system of the storage unit 120, and the corresponding directory stores therein the HTML documents and image files, for example. The page storage unit 122 may be configured to directly store the acquired HTML documents, image files, and others into the storage area.

Figure 4:
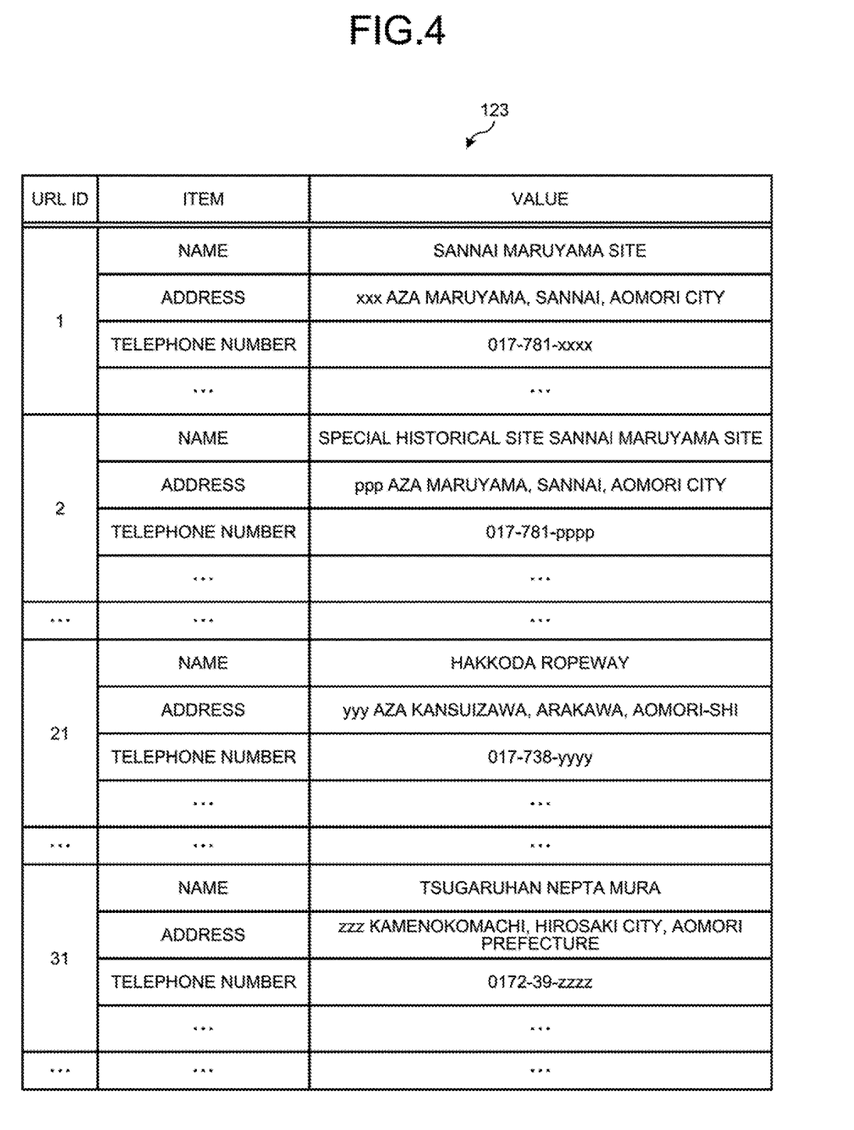
FIG. 4 is a diagram illustrating one example of an extracted-data storage unit.

Returning to the description of FIG. 1, the extracted-data storage unit 123 stores therein items and the values thereof on the information extracted from the HTML document. That is, the extracted-data storage unit 123 is a database that stores therein the data collected by the crawling process. FIG. 4 is a diagram illustrating one example of the extracted-data storage unit. As illustrated in FIG. 4, the extracted-data storage unit 123 includes items such as "URL ID", "item", and "value". The extracted-data storage unit 123, for each URL ID, stores therein one or more of items and the values thereof in the corresponding HTML document, for example. The data stored in the extracted-data storage unit 123 can be registered easily into respective items of a document of any format.

"URL ID" identifies the target URL. "Item" indicates items of the acquired information. "Value" indicates values of the acquired information. In the example of the first row in FIG. 4, on the first information on URL ID "1", the item, is "name" and the value is "Sannai Maruyama site".

Figure 5:
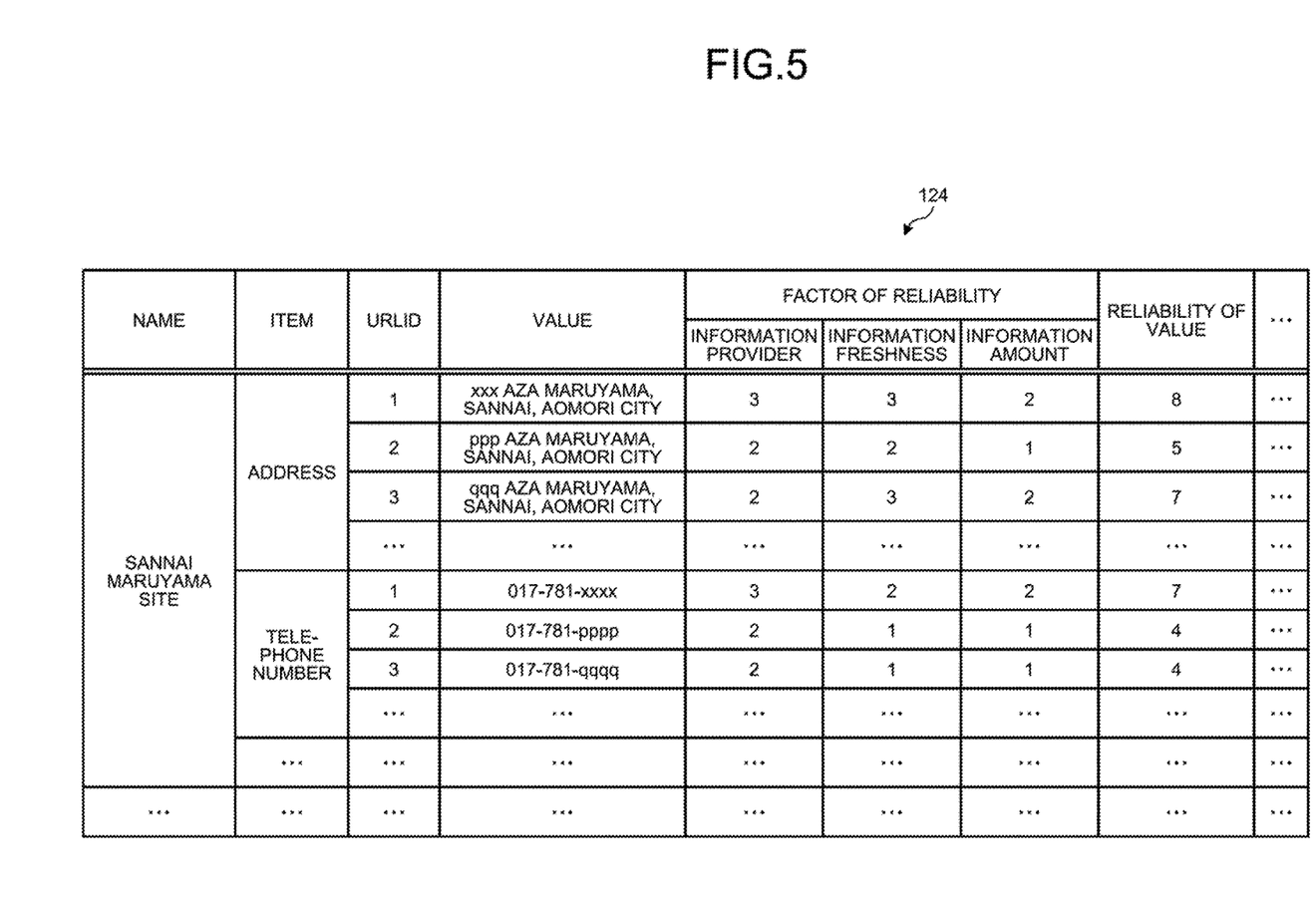
FIG. 5 is a diagram illustrating one example of a reliability storage unit.

Returning to the description of FIG. 1, the reliability storage unit 124, for each item of a tourist spot, stores therein the corresponding value, and the reliability (score) of the value, for example. FIG. 5 is a diagram illustrating one example of the reliability storage unit. As illustrated in FIG. 5, the reliability storage unit 124 includes items such as "name", "item", "URL ID", "value", "factor of reliability", and "reliability of value". The reliability storage unit 124 stores them as one record for each URL ID, for example.

"Name" indicates the name of a tourist spot and the like, for example. "Item" indicates each item corresponding to the name. Examples of the item include an address and a telephone number corresponding to the tourist spot. "URL ID" identifies data corresponding to the item, that is, the target URL from which the value of the item was acquired. "Value" indicates the data corresponding to the item. Examples of the value, on the telephone number, include the cases of "017-781-xxxx" for the site with the URL ID of "1", and "017-781-pppp" for the site with the URL ID of "2".

"Factor of reliability" further includes items such as "information provider", "information freshness", and "information amount", and indicates the score of reliability for each value. "Information provider" indicates a score based on an organization that manages the site of the target URL, for example. "Information freshness" indicates a score based on the last update date, for example. "Information amount" indicates the amount of information in the HTML document corresponding to the target URL, for example. "Reliability of value" indicates a value obtained by adding up the score of the factors of reliability on the values for each URL ID. As the value of each reliability (score) is greater, the reliability is higher.

Figure 6:
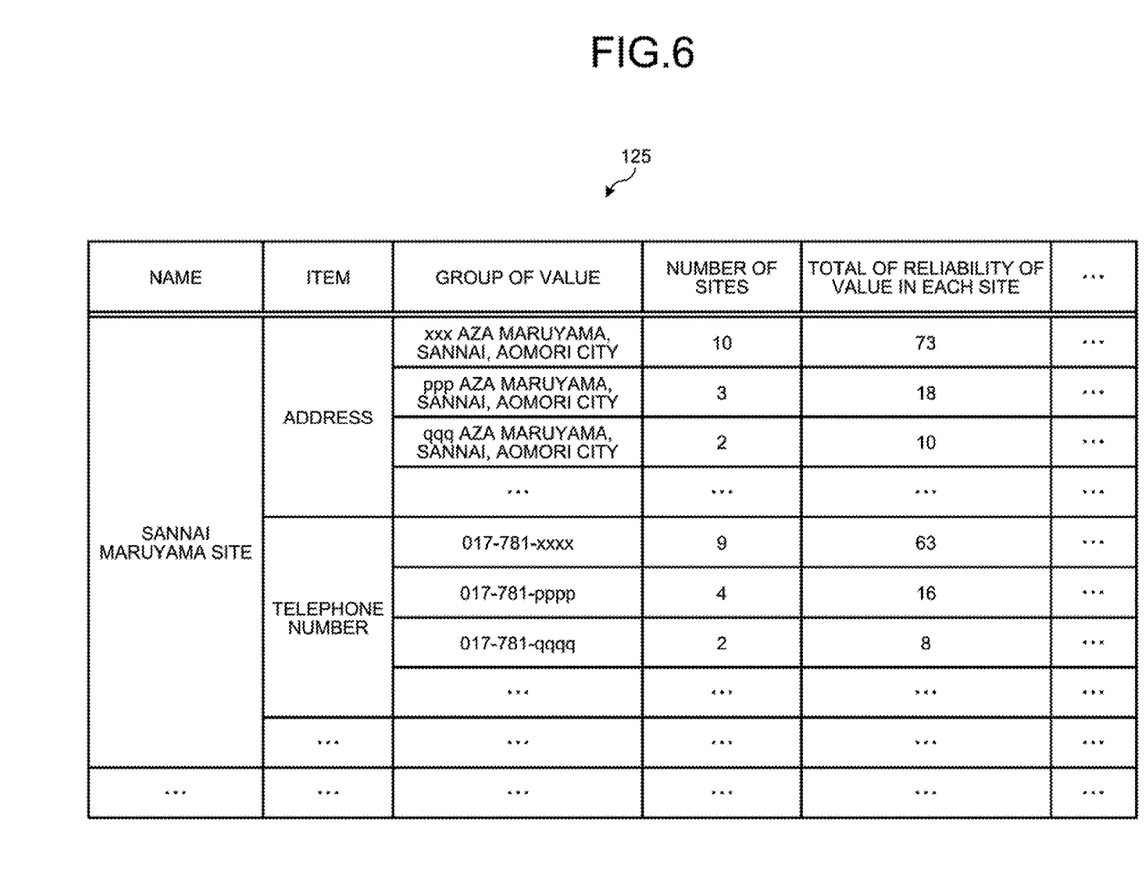
FIG. 6 is a diagram illustrating one example of a group storage unit.

Returning to the description of FIG. 1, the group storage unit 125, on the values of the item, puts together the values having the identical content into groups, and for each group, stores therein the group in association with the number of URL IDs having the relevant value, that is, the number of sites. FIG. 6 is a diagram illustrating one example of the group storage unit. As illustrated in FIG. 6, the group storage unit 125 includes items such as "name", "item", "group of value", "number of sites", and "total of reliability of value in each site".

"Name" indicates the name of a tourist spot and the like, for example. "Item" indicates each item corresponding to the name. Examples of the item include an address and a telephone number corresponding to the tourist spot. "Group of value" indicates the group of a value having identical content. "Number of sites" indicates the number of sites from which the value having the identical content was acquired, that is, the number of target URLs. "Total of reliability of value in each site" is, for example on a value of a certain telephone number, a value obtained by adding the reliability of value of the sites, from which the relevant value was acquired, for the number of sites having the relevant value. As the total of the reliability of value in the respective sites is greater, the reliability is higher. In FIG. 6, as for the item "telephone number" of the name "Sannai Maruyama site", in the group of the value "017-781-xxxx", for example, it indicates that there are nine sites having the relevant value and that the total of the reliability of value of the telephone number "017-781-xxxx" in the nine sites is "63". Meanwhile, in the group of the value "017-781-pppp", it indicates that there are four sites having the relevant value and that the total of the reliability of value of the telephone number "017-781-pppp" in the four sites is "16".

Returning to the description of FIG. 1, the controller 130 is implemented by a central processing unit (CPU), a micro processing unit (MPU), and the like, by executing a program stored in an internal storage device with a RAM as a work area, for example. The controller 130 may be implemented by an integrated circuit such as an application specific integrated circuit (ASIC) and a field programmable gate array (FPGA), for example. The controller 130 includes an acquisition unit 131, a calculation unit 132, a classification unit 133, a specifying unit 134, and an output controller 135, and implements or executes the function and operation of information processing described in the following. The internal configuration of the controller 130 is not limited to the configuration illustrated in FIG. 1, and may be in other configurations as long as it is the configuration that performs the information processing which will be described later.

The acquisition unit 131 receives target URLs to circulate in a crawling process. The controller 130 receives the input of target URL as the input device of the input unit 101 is operated by the administrator, for example. The acquisition unit 131 stores the received target URL in the target storage unit 121.

The acquisition unit 131 refers to the target storage unit 121 and accesses a website that includes a target URL, for example, a top page of a certain tourist information site. That is, the acquisition unit 131 transmits a page request to a server of the certain tourist information site via the communication unit 110, and receives the page content from the relevant server via the communication unit 110. The acquisition unit 131 accesses the website including the target URL regularly or irregularly, that is, at intervals specified in advance by the administrator, or at any desired timing, for example. The specified intervals can be in any intervals such as one day, one week, and one month, for example. The acquisition unit 131 refers to the target storage unit 121, and out of all the links in a website, selects a target URL to acquire the page content. The acquisition unit 131 selects the target URL of the page for each tourist spot, for example. The acquisition unit 131 acquires the page content from the selected target URL. The acquisition unit 131 stores the acquired page content in the page storage unit 122. That is, the acquisition unit 131 executes the crawling process on the website including the target URL, and stores the acquired page content in the page storage unit 122.

The acquisition unit 131 extracts, from the page content of the target URL stored in the page storage unit 122, the items and the values thereof. The acquisition unit 131, as the items and the values thereof, extracts the items and the values thereof being separated by a certain tag or a symbol between each other, for example. The acquisition unit 131, for each URL ID of the target URL, associate's the items and the values thereof with one another and stores them in the extracted-data storage unit 123. Upon storing the extracted items and the values thereof into the extracted-data storage unit 123, the acquisition unit 131 outputs extraction completion information to the calculation unit 132.

Upon receiving the extraction completion information from the acquisition unit 131, the calculation unit 132 refers to the extracted-data storage unit 123 and, based on the factor of reliability, calculates the reliability for each value of the target URL. Taking the first row in FIG. 5 as an example, first of all, the site of the target URL of the URL IP "1" is the site concerning the name "Sannai Maruyama site", and the value of the item "address" is "xxx Aza Maruyama, Sannai, Aomori city". For example, when the relevant site is an official page and the information provider is Aomori prefecture, the calculation unit 132 sets the score of the information provider to "3" indicating that the reliability is high. Furthermore, for example, when the last update date of the relevant site is within a half year, the calculation unit 132 sets the score of the information freshness to "3" indicating that the reliability is high. Moreover, as for the amount of information, when the relevant site describes in detail such as describing up to the department in charge, the calculation unit 132 sets the score of the information amount to "2" indicating that the reliability is high, for example.

The calculation unit 132 further sets the total value of the calculated score of each factor of reliability as the reliability of the relevant item, for example, as the reliability of the address. In the example of the first row in FIG. 5, the reliability of value of the item "address" of the URL ID "1" is 3+3+2=8. The calculation unit 132 stores the calculated reliability into the reliability storage unit 124 in association with the item, URL ID, and value. Upon storing the calculated reliability in the reliability storage unit 124, the calculation unit 132 outputs calculation completion information to the classification unit 133 and the specifying unit 134.

The classification unit 133, upon receiving the calculation completion information from the calculation unit 132, refers to the reliability storage unit 124 and, on the values of each item, classifies the values having the identical content into groups. For example, the classification unit 133 counts, on the item "telephone number" of the name "Sannai Maruyama site", the number of sites for which the value is "017-781-xxxx", and sets it as the number of sites of the group of value "017-781-xxxx". In the same manner, the classification unit 133 counts, for example, the number of sites for which the value is "017-781-pppp", and sets it as the number of sites of the group of value "017-781-pppp".

The classification unit 133 further calculates the total of the reliability of value in each site in the group of value. For example, in the group of the value "017-781-xxxx" illustrated in FIG. 6, when there are nine sites having the relevant value, the reliability of value of the respective sites is, for example, 8, 7, 6, or others, and the classification unit 133 calculates "63" that is a total value. The classification unit 133, for each item, associates with one another the group of value, the number of sites, and the total of the reliability of value in each site, and stores them in the group storage unit 125 as a classification result. Upon storing the classification result in the group storage unit 125, the classification unit 133 outputs classification completion information to the output controller 135.

The classification unit 133 may classify into groups the values of the other sites that exclude a first site to which the highest reliability was assigned. In this case, on the values of the other sites, the classification unit 133, for each item, associates with one another the group of value, the number of sites, and the total of the reliability of value in each site, and stores them in the group storage unit 125 as a classification result. Upon storing the classification result in the group storage unit 125, the classification unit 133 outputs classification completion information to the output controller 135.

The specifying unit 134, upon receiving the calculation completion information from the calculation unit 132, refers to the reliability storage unit 124 and specifies the reliability of the target URL. The specifying unit 134 acquires the reliability of value corresponding to the URL ID of the target URL in the reliability storage unit 124. The specifying unit 134 calculates the sum of the reliability of value of each item for which the URL ID is identical and specifies the reliability of the site. The specifying unit 134 stores the specified reliability of the site into the target storage unit 121, and outputs specifying information to the output controller 135.

The output controller 135, upon receiving the specifying information from the specifying unit 134, refers to the target storage unit 121 and the reliability storage unit 124 and, as output data, outputs to the output unit 102 the respective items, the values thereof, and the reliability of the site from which the respective items and the values were acquired, and causes the output unit 102 to display them. That is, the output controller 135 outputs, as output data, the items and the values thereof extracted by the acquisition unit 131 together with the specified reliability to the output unit 102, and causes the output unit 102 to display them.

Figure 7:
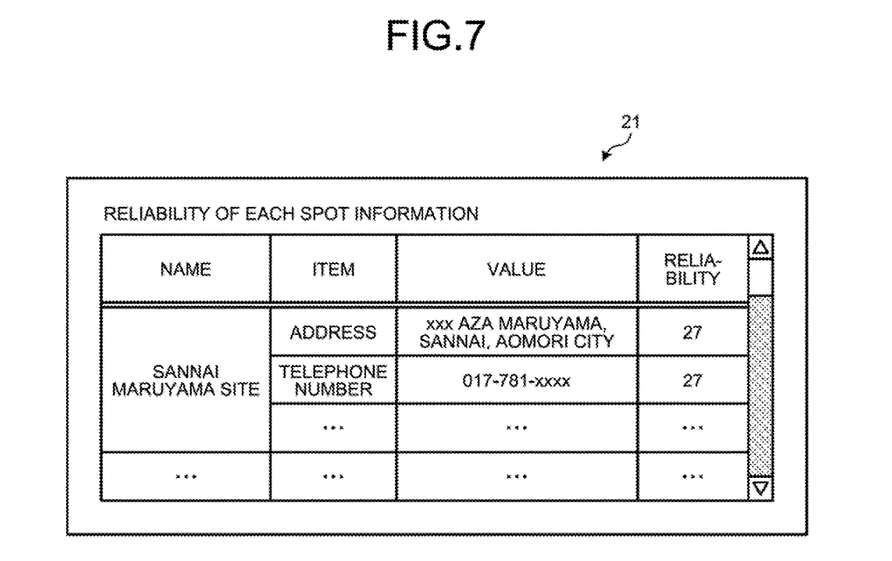
FIG. 7 is a diagram illustrating one example of a display screen of a verification result.

An example of a display screen will be described. FIG. 7 is a diagram illustrating one example of the display screen of a verification result. A display screen 21 illustrated in FIG. 7 indicates that the reliability of the sire from which the address "xxx Aza Maruyama, Sannai, Aomori city" of "Sannai Maruyama site", which is a tourist spot, was acquired is "27", for example. The site from which the data (value) of the address was acquired is the site of the target URL for which the URL ID stored in the target storage unit 121 is "1", for example. Furthermore, in the display screen 21, when the site from which the data of the telephone number was acquired is URL ID "1", the reliability of the telephone number is "27" as with the address, for example.

The output controller 135, upon receiving the classification completion information from the classification unit 133, refers to the group storage unit 125 and, as the output data, outputs to the output unit 102 the values belonging to the group, for which the number of sites is the largest, out of the groups of value together with the total of the reliability of value in each site, and causes the output unit 102 to display them. That is, the output controller 135 outputs, as the output data, the values of the group for which the number of components of the group is the largest together with the reliability corresponding to the number of components of the group to the output unit 102, and causes the output unit 102 to display them.

Figure 8:
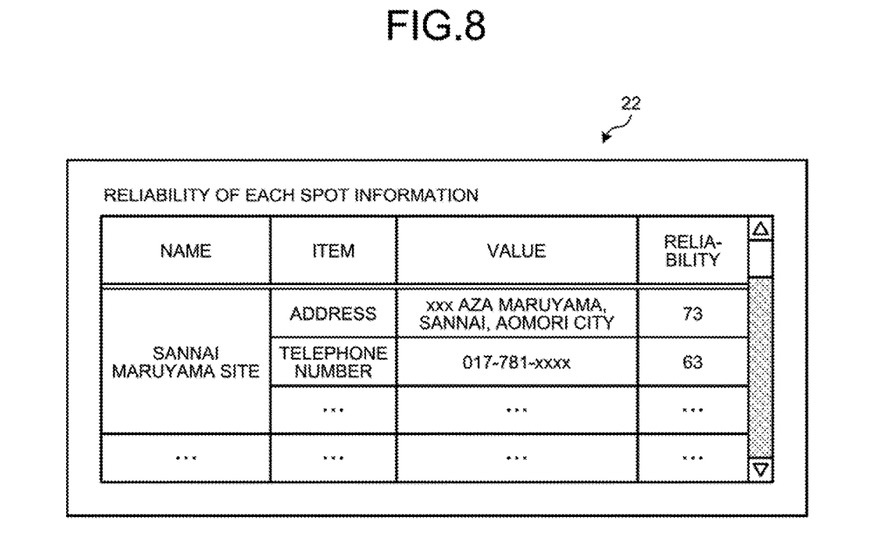
FIG. 8 is a diagram illustrating another example of the display screen of the verification result.

Another example of the display screen will be described. FIG. 8 is a diagram illustrating another example of the display screen of the verification result. The display screen 22 illustrated in FIG. 8 indicates that the reliability of the address "xxx Aza Maruyama, Sannai, Aomori city" of "Sannai Maruyama site" that is a tourist spot is "73", for example. The data (value) of the address is the value that belongs to the group of the value "xxx Aza Maruyama, Sannai, Aomori city" and is the one for which the number of sites was the largest as compared with the groups of other values. Furthermore, in the display screen 22, on the data (value) of the telephone number, "017-781-xxxx" for which the number of sites was the largest is displayed together with the reliability "63", for example.

When the values of the other sites that exclude a first site to which the highest reliability was assigned were classified into groups in the classification unit 133, the output controller 135 compares the reliability between the first site and the other sites. That is, the output controller 135 compares the reliability of the first site and the reliability corresponding to the number of components of a specific group for which the number of components of the group in the other sites is the largest. The output controller 135 determines, as a result of the comparison, whether the reliability corresponding to the number of components of the specific group is higher than the reliability of the first site.

When the reliability corresponding to the number of components of the specific group is higher than the reliability of the first site, the output controller 135, as the output data, outputs to the output unit 102 the items, and the values belonging to the specific group, and causes the output unit 102 to display them. When the reliability corresponding to the number of components of the specific group is equal to or lower than the reliability of the first site, the output controller 135 outputs, as the output data, the items of the first site and the values thereof to the output unit 102, and causes the output unit 102 to display them.

Next, the operation of the data verification device 100 in the embodiment will be described. First of all, a first verification process will be described.

Figure 9:
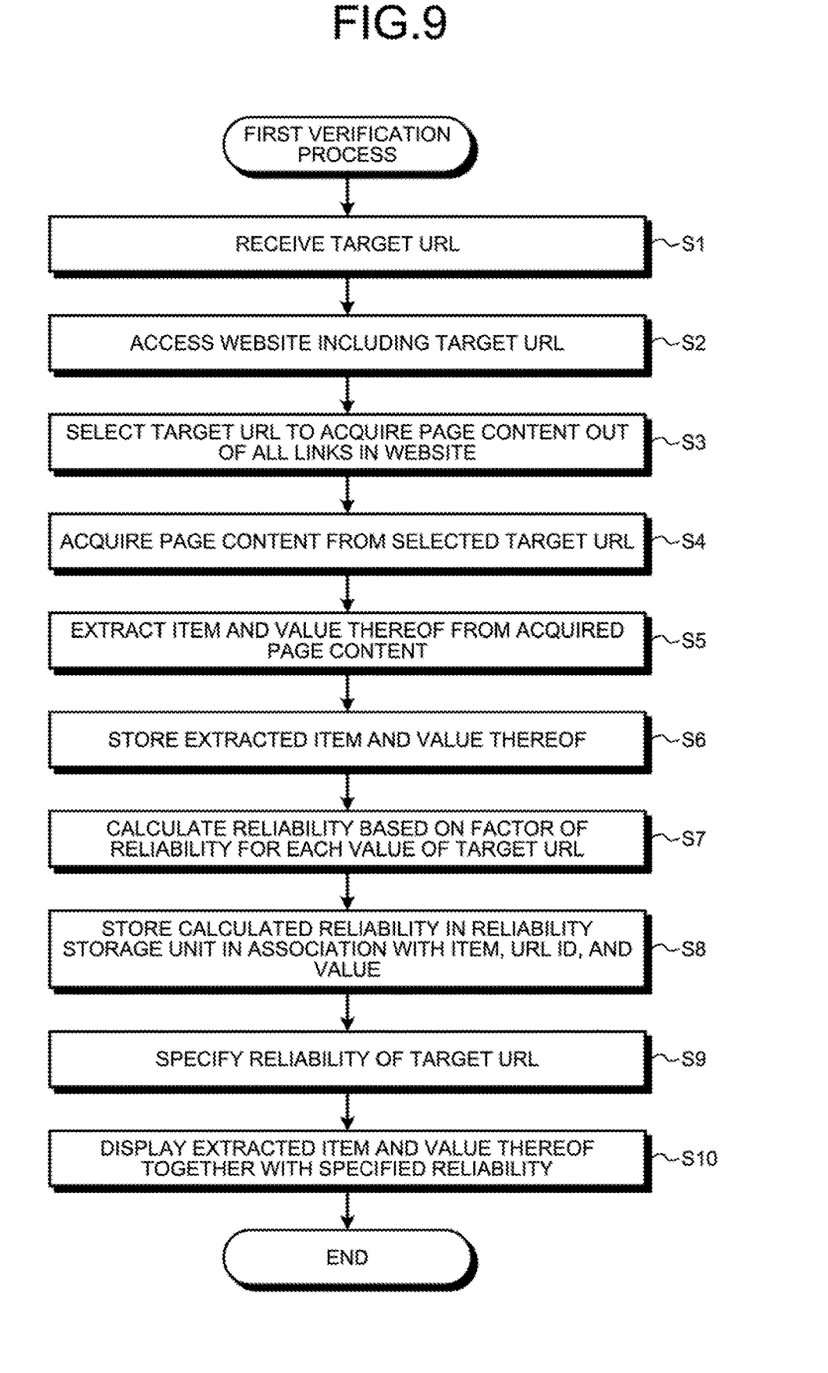
FIG. 9 is a flowchart illustrating one example of a first verification process.

FIG. 9 is a flowchart illustrating one example of the first verification process. The acquisition unit 131 receives a target URL to circulate in a crawling process (Step S1). The acquisition unit 131 stores the received target URL in the target storage unit 121. The acquisition unit 131 accesses a website including the target URL regularly or irregularly, that is, at intervals specified in advance by the administrator, or at any desired timing, for example (Step S2). The acquisition unit 131 refers to the target storage unit 121, and out of all the links in the website, selects a target URL to acquire page content (Step S3).

The acquisition unit 131 acquires the page content from the selected target URL (Step S4). The acquisition unit 131 stores the acquired page content in the page storage unit 122. The acquisition unit 131 extracts, from the page content of the target URL stored in the page storage unit 122, the items and the values thereof (Step S5). The acquisition unit 131 associates the items and the values thereof for each URL ID of the target URL with one another, and stores them into the extracted-data storage unit 123 (Step S6). Upon storing the extracted items and the values thereof into the extracted-data storage unit 123, the acquisition unit 131 outputs extraction completion information to the calculation unit 132.

The calculation unit 132, upon receiving the extraction completion information from the acquisition unit 131, refers to the extracted-data storage unit 123 and, based on the factor of reliability, calculates the reliability for each value of the target URL (Step S7). The calculation unit 132 stores the calculated reliability into the reliability storage unit 124 in association with the item, URL ID, and value (Step S8). Upon storing the calculated reliability in the reliability storage unit 124, the calculation unit 132 outputs calculation completion information to the specifying unit 134.

The specifying unit 134, upon receiving the calculation completion information from the calculation unit 132, refers to the reliability storage unit 124 and specifies the reliability of the target URL (Step S9). The specifying unit 134 stores the specified reliability of the site into the target storage unit 121, and outputs specifying information to the output controller 135.

The output controller 135, upon receiving the specifying information from the specifying unit 134, refers to the target storage unit 121 and the reliability storage unit 124 and outputs, as output data, the items and the value thereof extracted in the acquisition unit 131 together with the specified reliability to the output unit 102, and causes the output unit 102 to display them (Step S10). Consequently, the data verification device 100 can output the data of the item together with the reliability, and thus highly reliable information can be set as the information to be described in a document.

Figure 10:
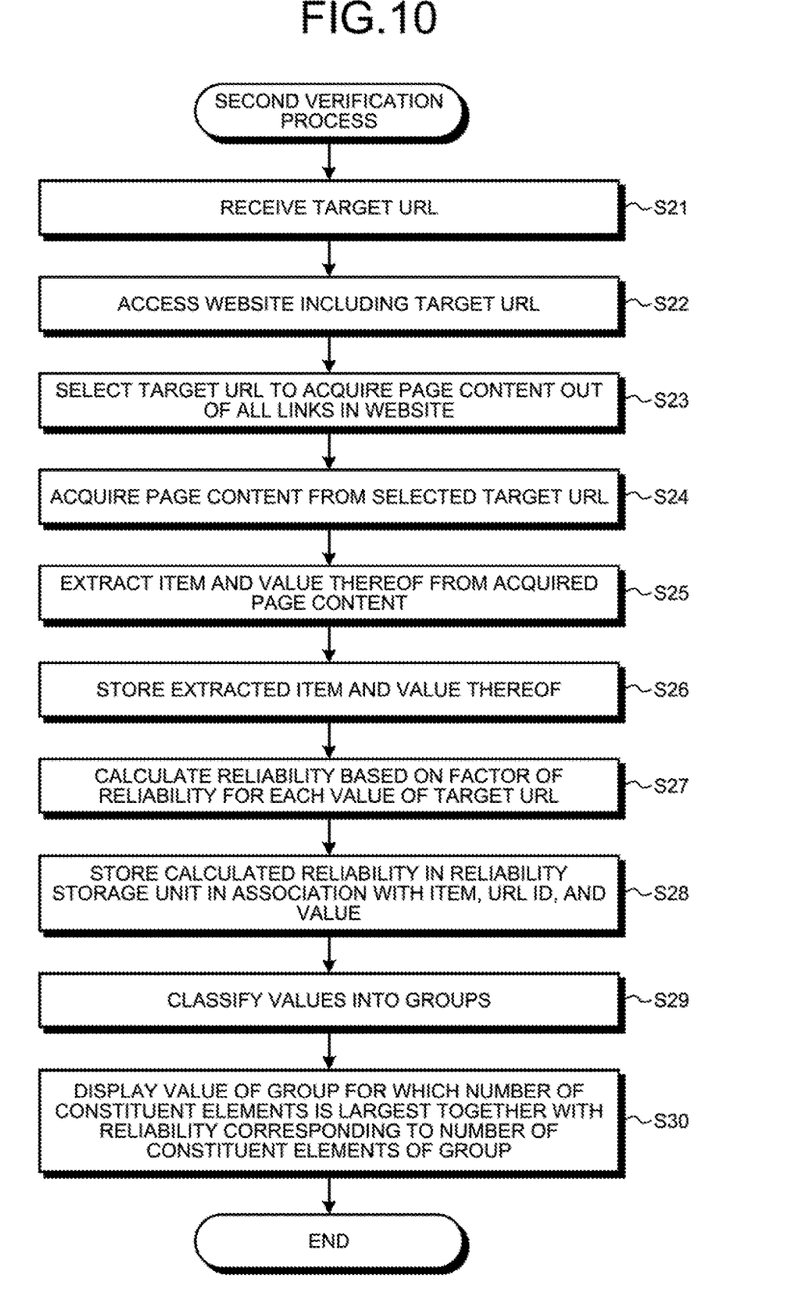
FIG. 10 is a flowchart illustrating one example of a second verification process.

Next, a second verification process will be described. FIG. 10 is a flowchart illustrating one example of the second verification process.

The acquisition unit 131 receives a target URL to circulate in a crawling process (Step S21). The acquisition unit 131 stores the received target URL in the target storage unit 121. The acquisition unit 131 accesses a website including the target URL regularly or irregularly, that is, at intervals specified in advance by the administrator, or at any desired timing, for example (Step S22). The acquisition unit 131 refers to the target storage unit 121, and out of all the links in the website, selects a target URL to acquire page content (Step S23).

The acquisition unit 131 acquires the page content from the selected target URL (Step S24). The acquisition unit 131 stores the acquired page content in the page storage unit 122. The acquisition unit 131 extracts, from the page content of the target URL stored in the page storage unit 122, the items and the values thereof (Step S25). The acquisition unit 131 associates the items and the values thereof for each URL ID of the target URL with one another, and stores them into the extracted-data storage unit 123 (Step S26). Upon storing the extracted items and the values thereof into the extracted-data storage unit 123, the acquisition unit 131 outputs extraction completion information to the calculation unit 132.

The calculation unit 132, upon receiving the extraction completion information from the acquisition unit 131, refers to the extracted-data storage unit 123 and, based on the factor of reliability, calculates the reliability for each value of the target URL (Step S27). The calculation unit 132 stores the calculated reliability into the reliability storage unit 124 in association with the item, URL ID, and value (Step S28). Upon storing the calculated reliability in the reliability storage unit 124, the calculation unit 132 outputs calculation completion information to the classification unit 133.

The classification unit 133, upon receiving the calculation completion information from the calculation unit 132, refers to the reliability storage unit 124 and, on the values of each item, classifies the values having the identical content into groups (Step S29). The classification unit 133 further calculates the total of the reliability of value in each site in the group of value. The classification unit 133, for each item, associates with one another the group of value, the number of sites, and the total of the reliability of value in each site, and stores them in the group storage unit 125 as a classification result. Upon storing the classification result in the group storage unit 125, the classification unit 133 outputs classification completion information to the output controller 135.

Upon receiving the classification completion information from the classification unit 133, the output controller 133 outputs, as the output data, the values of the group for which the number of components of the group is the largest together with the reliability corresponding to the number of components of the group to the output unit 102, and causes the output unit 102 to display them (Step S30). Consequently, the data verification device 100 can output the value of the group, for which the number of components of the group is the largest, together with the reliability, and thus the information for which the number of posted sites is the largest, out of a variety of types of information, can be set as the information to be described in a document as highly reliable information.

Figure 11:
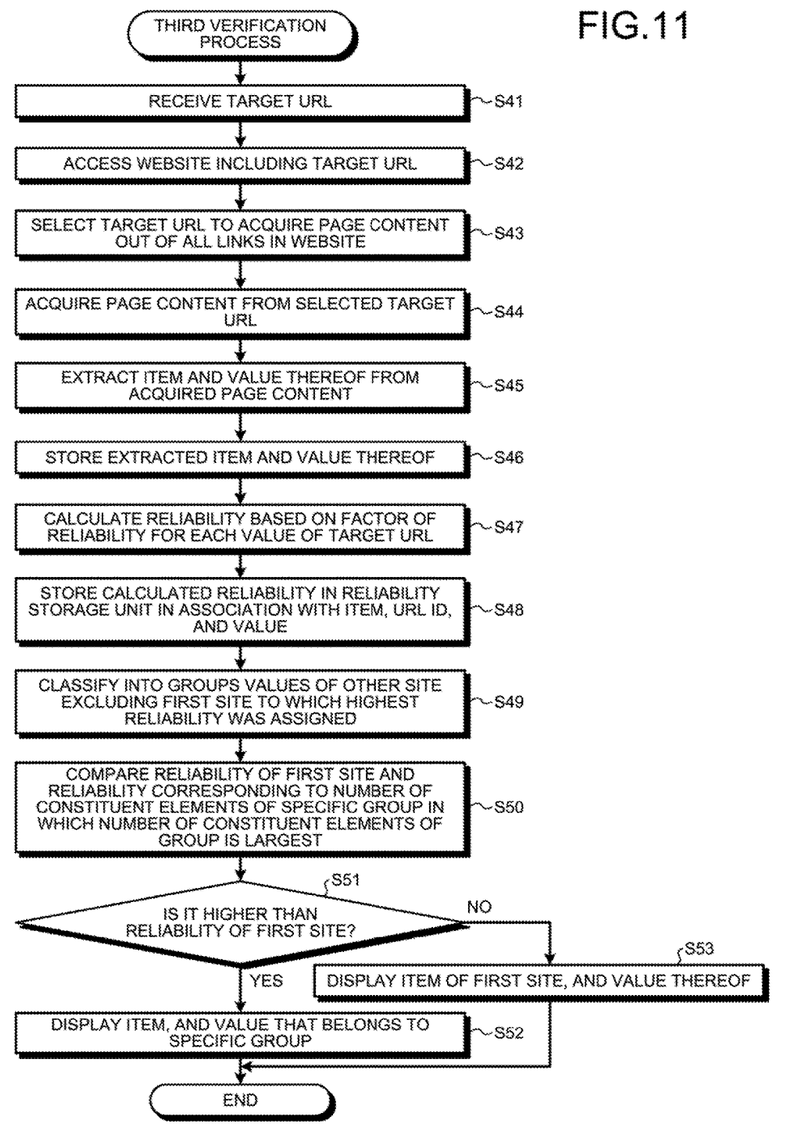
FIG. 11 is a flowchart illustrating one example of a third verification process.

Next, a third verification process will be described. FIG. 11 is a flowchart illustrating one example of the third verification process.

The acquisition unit 131 receives a target URL to circulate in a crawling process (Step S41). The acquisition unit 131 stores the received target URL in the target storage unit 121. The acquisition unit 131 accesses a website including the target URL regularly or irregularly, that is, at intervals specified in advance by the administrator, or at any desired timing, for example (Step S42). The acquisition unit 131 refers to the target storage unit 121, and out of all the links in the website, selects a target URL to acquire the page content (Step S43).

The acquisition unit 131 acquires the page content from the selected target URL (Step S44). The acquisition unit 131 stores the acquired page content in the page storage unit 122. The acquisition unit 131 extracts, from the page content of the target URL stored in the page storage unit 122, the items and the values thereof (Step S45). The acquisition unit 131 associates the items and the values thereof for each URL ID of the target URL with one another, and stores them into the extracted-data storage unit 123 (Step S46). Upon storing the extracted items and the values thereof into the extracted-data storage unit 123, the acquisition unit 131 outputs extraction completion information to the calculation unit 132.

The calculation unit 132, upon receiving the extraction completion information from the acquisition unit 131, refers to the extracted-data storage unit 123 and, based on the factor of reliability, calculates the reliability for each value of the target URL (Step S47). The calculation unit 132 stores the calculated reliability into the reliability storage unit 124 in association with the item, URL ID, and value (Step S48). Upon storing the calculated reliability in the reliability storage unit 124, the calculation unit 132 outputs calculation completion information to the classification unit 133.

The classification unit 133 classifies into groups the values of the other sites that exclude a first site to which the highest reliability was assigned (Step S49). On the values of the other sites, the classification unit 133, for each item, associates with one another the group of value, the number of sites, and the total of the reliability of value in each site, and stores them in the group storage unit 125 as a classification result. Upon storing the classification result in the group storage unit 125, the classification unit 133 outputs classification completion information to the output controller 135.

The output controller 135, upon receiving the classification completion information from the classification unit 133, compares the reliability of the first site and the reliability corresponding to the number of components of a specific group for which the number of components of the group is the largest (Step S50). The output controller 135 determines, as a result of the comparison, whether the reliability corresponding to the number of components of the specific group is higher than the reliability of the first site (Step S51).

When the reliability corresponding to the number of components of the specific group is higher than the reliability of the first site (Yes at Step S51), the output controller 135, as the output data, outputs to the output unit 102 the items, and the values belonging to the specific group, and causes the output unit 102 to display them (Step S52). When the reliability corresponding to the number of components of the specific group is equal to or lower than the reliability of the first site (No at Step S51), the output controller 135, as the output data, outputs to the output unit 102 the items of the first site and the values thereof, and causes the output unit 102 to display them (Step S53). Consequently, the data verification device 100, by comparing a first site for which the update frequency is low although the reliability is high and the other site for which the update frequency is high although the reliability is lower than the first site, can output more reliable information, for example.

That is, in the data verification device 100, when the telephone number of a certain tourist spot is changed, there is a case in which the change in the telephone number is not reflected in the first site for which the update is slow although it is the official site of the tourist spot. The data verification device 100 can output, on the telephone number of the relevant tourist spot, more reliable information in which the change has been reflected, by acquiring the new telephone number from the other site for which the update frequency of the telephone number is high, for example.

As in the foregoing, out of a plurality of sites registered as acquisition sources of specific information, the data verification device 100 specifies, based on the storage content of the storage unit 120 that stores therein the reliability in association with each of the sites, the reliability of the site from which the information was acquired as the specific information. The data verification device 100 outputs the information acquired as the specific information together with the specified reliability. As a result, it is possible to enhance the reliability of the information to be described in a document and output it.

Furthermore, the data verification device 100 acquires information as specific information from a plurality of sites that are registered as acquisition sources of the specific information. The data verification device 100, when grouping according to the consistency of the content of information is performed on the acquired information, outputs the information belonging to a group for which the number of components of the group is the largest, together with the reliability corresponding to the number of components of the group. As a result, out of a variety of types of information, the information for which the number of posted sites is the largest can be set as the information to be described in the document as highly reliable information.

Furthermore, the data verification device 100 acquires information as specific information from a plurality of sites that are registered as acquisition sources of the specific information. The data verification device 100, with respect to the reliability of a first site to which the highest reliability was assigned out of a plurality of sites from which the information was acquired as the specific information, further performs grouping on the information acquired from the other sites excluding at least the first site out of the sites according to the consistency of the content of information. The data verification device 100, when it is detected that the reliability calculated depending on the number of components of a specific group for which the number of components of the group is the largest indicates higher reliability, outputs the information belonging to the specific group. As a result, it is possible to output more reliable information in which the change in information has been reflected.

In the above-described embodiment, the websites of the target URLs have been received and circulated, and the reliability of the target URLs, the respective items, and the values thereof has been calculated. However, the embodiment is not limited thereto. For example, if may be configured to regularly circulate the websites of the target URLs, to calculate the reliability of the target URLs, the respective items, and the values thereof, and in response to a request of the administrator of the data verification device 100, to cause the output unit 102 to display the reliability of the target URLs, the respective items, and the values thereof.

Furthermore, in the above-described embodiment, the data has been extracted from the HTML document acquired from the site on the Internet. However, the embodiment is not limited thereto. For example, it may be configured to acquire an HTML document stored in an SD memory card via the input unit 101, to extract respective items and the values thereof from the acquired HTML document, and to cause the output unit 102 to display the respective reliabilities.

The respective components of the illustrated units do not necessarily need to be physically configured as illustrated in the drawings. In other words, the specific forms of distribution or integration of the units are not limited to those illustrated, and the whole or a part thereof can be configured by being functionally or physically distributed or integrated in any unit, depending on various types of loads and usage. For example, the calculation unit 132 and the classification unit 133 may be integrated.

Moreover, the various processing functions performed in the units may be configured such that the whole or any part thereof is executed on the CPU (or a micro-computer such as an MPU and a micro controller unit (MCU)). It is obvious that the various processing functions may be configured such that the whole or any part thereof is executed on a program analysed and executed by the CPU (or a microcomputer such as an MPU and an MCU), or executed on the hardware by wired logic.

Figure 12:
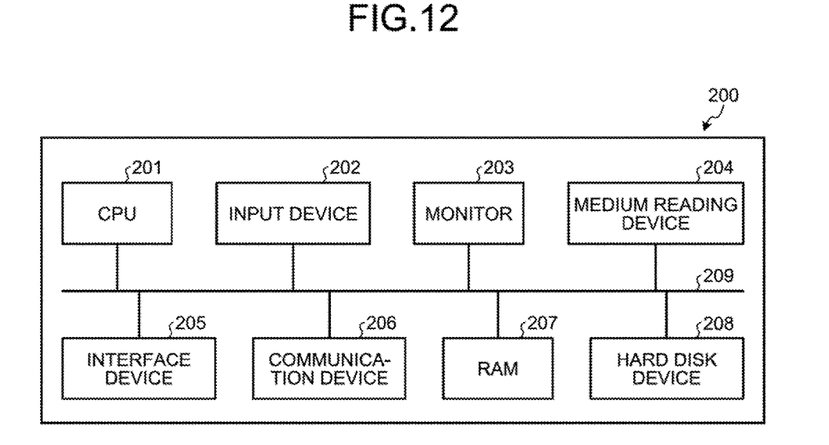
FIG. 12 is a diagram illustrating one example of a computer that executes a data verification program.

Incidentally, the various processing explained in the above-described embodiment can be implemented by executing a program prepared in advance on a computer. Thus, the following describes one example of a computer that executes a program having the functions the same as those of the above-described embodiment. FIG. 12 is a diagram illustrating one example of the computer that executes a data verification program.

As FIG. 12 illustrates, a computer 200 includes a CPU 201 that executes various arithmetic processes, an input device 202 that receives data input, and a monitor 203. The computer 200 further includes a medium reading device 204 that reads programs and the like from a storage medium, an interface device 205 for connecting to various devices, and a communication device 206 for connecting to other information processing apparatus and the like in a wired or wireless manner. The computer 200 further includes a RAM 207 that temporarily stores therein various types of information, and a hard disk device 208. The various devices 201 to 208 are connected to a bus 209.

In the hard disk device 208, stored is the data verification program that has the same functions as those of the processing units of the acquisition unit 131, the calculation unit 132, the classification unit 133, the specifying unit 134, and the output controller 135 illustrated in FIG. 1. In the hard disk device 208, further stored is various types of data to implement the target storage unit 121, the page storage unit 122, the extracted-data storage unit 123, the reliability storage unit 124, the group storage unit 125, and the data verification program. The input device 202 has the function the same as that of the input unit 101, and receives from an administrator of the computer 200 the input of various types of information such as the target URLs and management information, for example. The monitor 203 has the function the same as that of the output unit 102, and displays various screens such as a screen of the management information, a reception screen and a display screen to the administrator of the computer 200, for example. The interface device 205 connects to a printing device and the like, for example. The communication device 206 has the function the same as that of the communication unit 110 that is illustrated in FIG. 1, is connected to the network N, and exchanges various types of information with the sites on the Internet.

The CPU 201 reads out the programs stored in the hard disk device 208, and loads and executes them on the RAM 207, thereby performing respective pieces of processing. These programs can further cause the computer 200 to function as the acquisition unit 131, the calculation unit 132, the classification unit 133, the specifying unit 134, and the output controller 135 illustrated in FIG. 1.

The above-described data verification program does not necessarily need to be stored in the hard disk device 208. For example, it may be configured such that the computer 200 reads out and executes the program stored in a storage medium that the computer 200 can read. The storage medium that the computer 200 can read corresponds to a portable recording medium such as a CD-ROM, a DVD disc, and a universal serial bus (USB) memory; a semiconductor memory such as a flash memory; and a hard disk drive, for example. The computer 200 may further be configured, by storing the data verification program on devices connected to a public line, the Internet, a LAN and the like, to read out and execute the data verification program from these.

It is possible to enhance the reliability of the information to be described in a document and output it.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data verification device comprising:
a memory; and
a processor coupled to the memory, the processor executing a process including:
  acquiring information as specific information from a plurality of sites that are registered as acquisition sources of the specific information;
  specifying reliability of a site among the plurality of sites from which the information is acquired as the specific information based on storage content of a storage that stores therein reliability in association with each of the sites, wherein reliability of a site is calculated as a total of scores that each indicate reliability of information that is included in the site and acquired as the specific information and other specific information, the reliability of information being calculated as a total of a score based on an organization that manages the site, a score based on the last update date of the information, and a score indicating an amount of information in an HTML document corresponding to the site; and
  outputting the information acquired as the specific information together with the specified reliability of the site from which the information is acquired.

2. A data verification device comprising:
a memory; and
a processor coupled to the memory, the processor executing a process including:
  acquiring information as specific information from a plurality of sites that are registered as acquisition sources of the specific information;
  grouping the acquired information into groups according to consistency of content thereof; and
  specifying a group from among the groups wherein the number of sites from which the specific information belonging to the group is acquired is the largest;
  calculating a total of reliability of the acquired information of the specified group based on storage content of a storage that stores therein the reliability in association with the acquired information and each of the plurality of sites, wherein the reliability of the acquired information of a site is calculated as a total of a score based on an organization that manages the site, a score based on the last update date of the acquired information, and a score indicating an amount of information in an HTML document corresponding to the site;

outputting the acquired information belonging to the specified group together with the calculated reliability.

3. A data verification device comprising:

a memory; and a processor coupled to the memory, the processor executing a process including:

acquiring information as specific information from a plurality of sites that are registered as acquisition sources of the specific information;

grouping the acquired information except information acquired from a first site into groups according to consistency of content thereof, the first site being assigned thereto a reliability that is highest among the plurality of sites wherein reliability is stored in a storage that stores therein reliability in association with each of the sites, wherein reliability of a site is calculated as a total of scores that each indicate reliability of information that is included in the site and acquired as the specific information and other specific information, the reliability of information being calculated as a total of a score based on an organization that manages the site, a score based on the last update date of the information, and a score indicating an amount of information in an HTML document corresponding to the site;

specifying a specific group from among the groups wherein the number of sites from which the information belonging to the specific group is acquired is the largest;

calculating a total of reliability of the acquired information of the specified specific group based on storage content of a storage that stores therein the reliability in association with the acquired information and each of the plurality of sites, wherein the reliability of the acquired information of a site is calculated as a total of a score based on an organization that manages the site, a score based on the last update date of the acquired information, and a score indicating an amount of information in an HTML document corresponding to the site;

determining whether the calculated reliability of the specific group is higher than the reliability of the first site; and outputting, when determining that the reliability of the specific group is higher than the reliability of the first site, the information belonging to the specific group.

* * * * *